US012562586B2

(12) United States Patent
Bailey et al.

(10) Patent No.: US 12,562,586 B2
(45) Date of Patent: Feb. 24, 2026

(54) EMERGENCY LIGHTING SYSTEM

(71) Applicant: Hubbell Incorporated, Shelton, CT (US)

(72) Inventors: Christopher Lane Bailey, Greenville, SC (US); John Lane, Simpsonville, SC (US); Robert Papstein, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 638 days.

(21) Appl. No.: 17/277,154

(22) PCT Filed: Sep. 17, 2019

(86) PCT No.: PCT/US2019/051404
§ 371 (c)(1),
(2) Date: Mar. 17, 2021

(87) PCT Pub. No.: WO2020/060972
PCT Pub. Date: Mar. 26, 2020

(65) Prior Publication Data
US 2021/0376655 A1 Dec. 2, 2021

Related U.S. Application Data

(60) Provisional application No. 62/739,577, filed on Oct. 1, 2018, provisional application No. 62/733,372, filed on Sep. 19, 2018.

(51) Int. Cl.
*H02J 9/06* (2006.01)
*H02J 7/00* (2006.01)
(Continued)

(52) U.S. Cl.
CPC ............ *H02J 9/065* (2013.01); *H02J 7/0048* (2020.01); *H05B 47/172* (2024.01); *H05B 47/19* (2020.01); *H05B 47/1965* (2024.01)

(58) Field of Classification Search
USPC ................................................. 315/129–136
See application file for complete search history.

(56) References Cited

U.S. PATENT DOCUMENTS 6,144,310 A * 11/2000 Morris ................. G08B 25/009
340/693.11
6,502,044 B1 * 12/2002 Lane ....................... H02J 9/005
363/101
(Continued)

FOREIGN PATENT DOCUMENTS

CN 207460544 6/2018
CN 207518920 U 6/2018

OTHER PUBLICATIONS

A Less-known, but Commonly-used DIP Switch, Feb. 18, 17, NXP Community, https://community.nxp.com/t5/Other-NXP-Products/A-Less-known-but-Commonly-used-DIP-Switch/m-p/649757/highlight/true, accessed Mar. 7, 24 (Year: 2017).*
(Continued)

*Primary Examiner* — Thomas J. Hiltunen
(74) *Attorney, Agent, or Firm* — Michael Best & Friedrich LLP

(57) ABSTRACT

An emergency lighting fixture is provided. The emergency lighting fixture includes a backup power supply. The backup power supply includes one or more batteries. The emergency lighting fixture includes one or more light sources. The emergency lighting fixture includes a transceiver. The emergency lighting fixture includes a controller configured to determine a status of the backup power supply. The controller is further configured to transmit a beacon signal via the transceiver. The beacon signal can include the status of the backup power supply.

9 Claims, 7 Drawing Sheets

(51) Int. Cl.

| | |
|---|---|
| *H05B 47/17* | (2020.01) |
| *H05B 47/175* | (2020.01) |
| *H05B 47/19* | (2020.01) |

(56) References Cited

U.S. PATENT DOCUMENTS

| | | | | |
|---|---|---|---|---|
| 6,538,568 | B2 * | 3/2003 | Conley, III | G08B 7/062 |
| | | | | 315/86 |
| 7,321,302 | B2 * | 1/2008 | Beghelli | H05B 47/19 |
| | | | | 340/539.17 |
| 7,547,990 | B2 | 6/2009 | Varzhabedian | |
| 7,573,396 | B2 * | 8/2009 | Stokes | H05B 47/22 |
| | | | | 307/64 |
| 7,670,023 | B1 * | 3/2010 | Peterson | F21L 4/027 |
| | | | | 362/183 |
| 7,999,666 | B2 * | 8/2011 | Barrieau | H05B 47/22 |
| | | | | 340/331 |
| 8,218,547 | B2 * | 7/2012 | Van Steen | H04L 61/5092 |
| | | | | 370/352 |
| 9,521,724 | B1 * | 12/2016 | Berry | H05B 47/199 |
| 9,554,447 | B2 * | 1/2017 | Rains, Jr. | H05B 47/125 |
| 9,689,542 | B2 | 6/2017 | Anderson et al. | |
| 9,860,965 | B2 * | 1/2018 | Recker | H05B 47/105 |
| 9,961,750 | B2 * | 5/2018 | Leinen | H05B 47/198 |
| 10,028,357 | B2 | 7/2018 | Scordato | |
| 10,098,212 | B2 * | 10/2018 | Vendetti | H04W 72/0446 |
| 10,149,370 | B2 * | 12/2018 | Greene | H05B 47/105 |
| 10,163,324 | B2 * | 12/2018 | Vapurcuyan | G01R 31/36 |
| 10,333,341 | B2 * | 6/2019 | Catalano | H02J 9/061 |
| 10,420,185 | B2 * | 9/2019 | Biery | H05B 45/22 |
| 10,581,267 | B2 * | 3/2020 | Hariz | H05B 47/22 |
| 10,985,600 | B2 * | 4/2021 | Kuo | H05B 47/17 |
| 2005/0245235 | A1 * | 11/2005 | Vesuna | H04M 3/382 |
| | | | | 455/411 |
| 2011/0316426 | A1 * | 12/2011 | Iwanami | H05B 47/199 |
| | | | | 315/151 |
| 2012/0306621 | A1 * | 12/2012 | Muthu | H05B 47/199 |
| | | | | 340/10.5 |
| 2014/0340222 | A1 | 11/2014 | Thornton et al. | |
| 2017/0176539 | A1 * | 6/2017 | Younger | G01R 31/367 |
| 2017/0237471 | A1 | 8/2017 | Green et al. | |
| 2017/0238397 | A1 * | 8/2017 | Green | H05B 41/28 |
| | | | | 315/129 |
| 2018/0042083 | A1 | 2/2018 | Couch et al. | |
| 2018/0089983 | A1 | 3/2018 | Vapurcuyan et al. | |
| 2018/0262894 | A1 * | 9/2018 | Daoura | H04W 4/80 |
| 2018/0368221 | A1 * | 12/2018 | Johnson | H02J 7/0068 |

OTHER PUBLICATIONS

PCT/US2019051404 International Search Report and Written Opinion dated Dec. 3, 2019.

Chinese Patent Application No. 201980075662.6 First Office Action Issued by China National Intellectual Property Administration dated Oct. 19, 2022 and translation (18 pages).

Extended European Search Report dated May 24, 2022 for corresponding European Application No. 19863546.8.

Chinese Patent Application No. 201980075662.6 Second Office Action Issued by China National Intellectual Property Administration dated May 24, 2023 and translation (8 pages).

Chinese Patent Application No. 201980075662.6 Third Office Action Issued by China National Intellectual Property Administration dated Oct. 23, 2023 and translation (21 pages).

* cited by examiner

110

Fixture Housing
220

Backup Power Supply
230

Driver Circuit
250

Light Source
240

Transceiver
260

Controller
270

Input Device(s)
280

400

Detect a Beacon Signal
Transmitted by the
Emergency Lighting
Fixture ⌐402

Do One or More
Batteries Need to
be Replaced ⌐404

No

Yes

Provide a Notification to
Replace One or More
Batteries of the Backup
Power Supply Onboard
the Emergency Lighting
Fixture ⌐406

610

EMERGENCY LIGHTING SYSTEM

PRIORITY CLAIM

The present application claims the benefit of priority of U.S. Provisional App. No. 62/733,372, titled "Emergency Lighting System" and having a filing date of Sep. 19, 2018, which is incorporated by reference herein. The present application also claims the benefit of priority of U.S. Provisional App. No. 62/739,577, titled "Emergency Lighting System" and having a filing date of Oct. 1, 2018.

FIELD

The present subject matter relates generally to emergency lighting systems.

BACKGROUND

Emergency lighting systems include a plurality of emergency lighting fixtures. Each emergency lighting fixture can include one or more light sources and a battery power supply. During a power outage, the battery power supply can provide direct current (DC) power to the one or more light sources. In this manner, the one or more light sources can provide lighting during the power outage. Codes and standards promulgated by various agencies (e.g., National Fire Association) may necessitate that emergency lighting fixtures be tested multiple times every year. For instance, emergency lighting fixtures may be tested monthly for a duration of five minutes and annually for a duration of ninety minutes.

BRIEF DESCRIPTION

Aspects and advantages of embodiments of the present disclosure will be set forth in part in the following description, or may be learned from the description, or may be learned through practice of the embodiments.

An example aspect of the present disclosure is directed to an emergency lighting fixture. The emergency lighting fixture includes a backup power supply having one or more batteries. The emergency lighting fixture includes one or more light sources, such as light emitting diode (LED) devices. The emergency lighting fixture includes a transceiver. The emergency lighting fixture includes a controller configured to determine a status of the backup power supply. The controller is further configured to transmit a beacon signal via the transceiver. The beacon signal can include the status of the backup power supply.

Another example aspect of the present disclosure is directed to a method for generating a notification to replace one or more batteries of a backup power supply onboard an emergency lighting fixture. The method can include obtaining, at a user device within a predetermined proximity of the emergency lighting fixture, a beacon signal from the emergency lighting fixture. The method can further include determining, by the user device, the one or more batteries need to be replaced based, at least in part, on the beacon signal. Furthermore, responsive to determining the one or more batteries need to be replaced, the method can include providing, by the user device, a notification to replace the one or more batteries.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
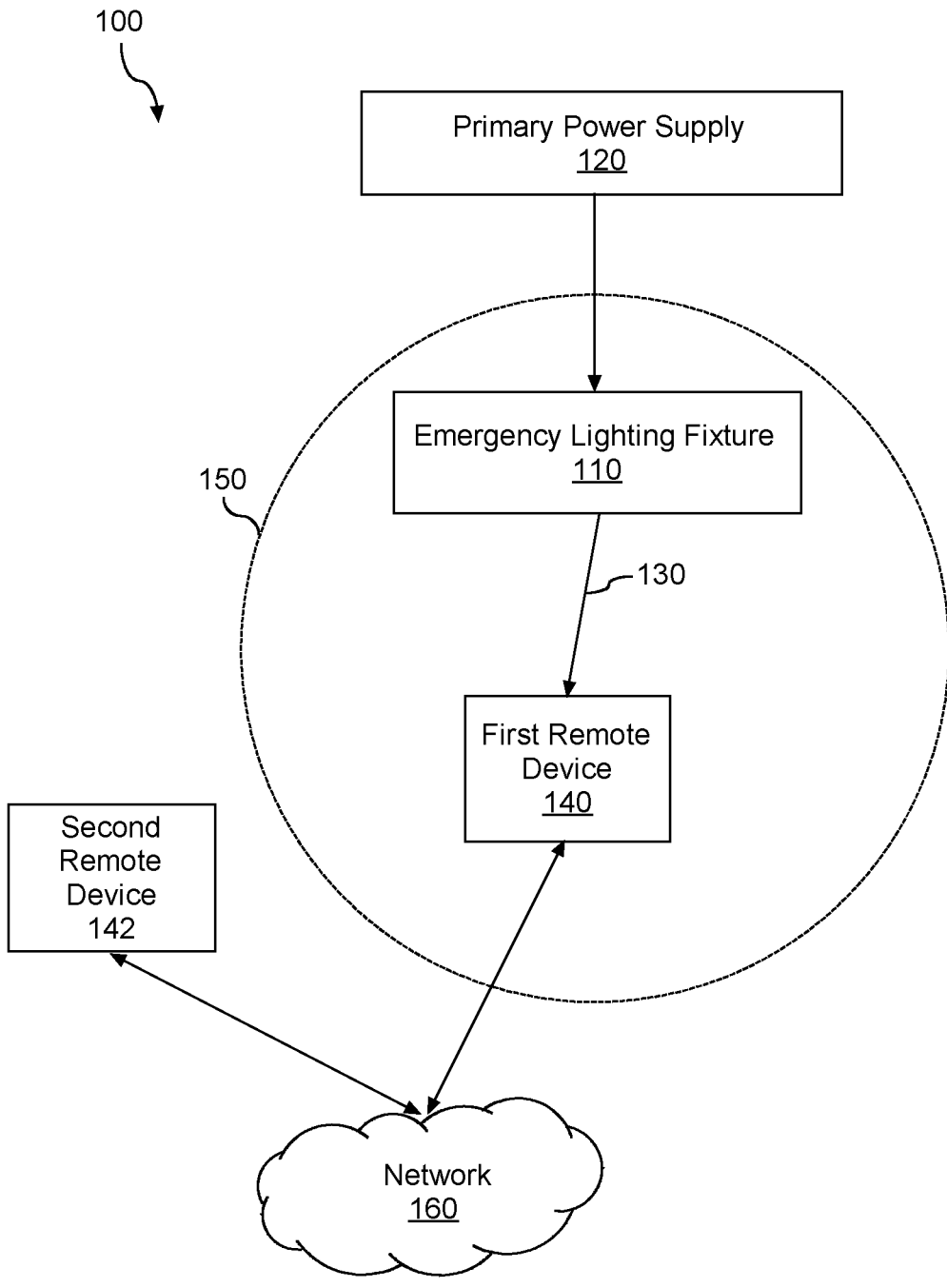
FIG. 1 depicts a block diagram of an emergency lighting system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an emergency lighting fixture. The emergency lighting fixture can include a backup power supply. The backup power supply can include one or more batteries. The emergency lighting fixture can include one or more light sources, such as light emitting diode (LED) devices. The emergency lighting fixture can include a transceiver and a controller. The controller can be configured to determine a status of the backup power supply. For example, the controller can monitor a terminal voltage of the one or more batteries to determine the status of the backup power supply. The controller can be further configured to transmit a beacon signal via the transceiver. The beacon signal can provide data indicative of the status of the backup power supply.

In some implementations, the controller can be configured to transmit the beacon signal only when the terminal voltage of the one or more batteries falls below (e.g., is less than) a threshold voltage required to illuminate the one or more light sources during a power outage. Alternatively, the controller can be configured to transmit the beacon signal regardless of whether the terminal voltage is above (e.g., greater than) or below (e.g., less than) the threshold voltage.

In some implementations, the beacon signal can be detected by a remote device that is within a predetermined proximity of the emergency lighting fixture. :For instance, the remote device can include a barcode scanner having a receiver that is tuned to receive the beacon signal when the barcode scanner is within the predetermined proximity of the emergency lighting fixture. Alternatively or additionally, the remote device can include a user device (e.g., smartphone, tablet, laptop) having a display screen. As will be discussed below in more detail, the remote device can, in some implementations, be configured to determine whether the one or more batteries need to be replaced based, at least in part, on the beacon signal.

In some implementations, the remote device can determine whether the one or more batteries need to be replaced based, at least in part, on the status of the backup power supply. If the terminal voltage of the one or more batteries is below the threshold voltage, then the remote device can be configured to determine the one or more batteries need to be replaced. When the remote device determines the one or more batteries need to be replaced, the remote device can generate a notification (e.g., email, text message, etc.) to perform a maintenance action on the emergency lighting fixture. In some implementations, the remote device can be connected to a network (e.g., WIFI). In this manner, the notification can be communicated over the network to another device.

The emergency lighting fixture according to example embodiments of the present disclosure can provide numerous technical benefits. For instance, the beacon signal that identifies the emergency lighting and the status of the backup power supply allows maintenance personnel to ascertain the status of the backup power supply without performing a manual test of the emergency lighting fixture, This is especially advantageous in retail stores that may include several emergency lighting fixtures dispersed throughout the store.

Referring now to FIG. 1, a block diagram of components of an emergency lighting system 100 is provided according to example embodiments of the present disclosure. As shown, the emergency lighting system 100 can include an emergency lighting fixture 110. It should also be appreciated that the emergency lighting fixture 110 can be installed at any suitable location within the interior of a building (e.g., retail store, restaurant, etc.). For instance, the emergency lighting fixture 110 can be installed at or near an exit of the building. It should also be appreciated that the emergency lighting system 100 can include more than one emergency lighting fixture 110. As will be discussed below in more detail, the emergency lighting fixture 110 can provide light to illuminate the interior of the building during a power outage.

Figure 2:
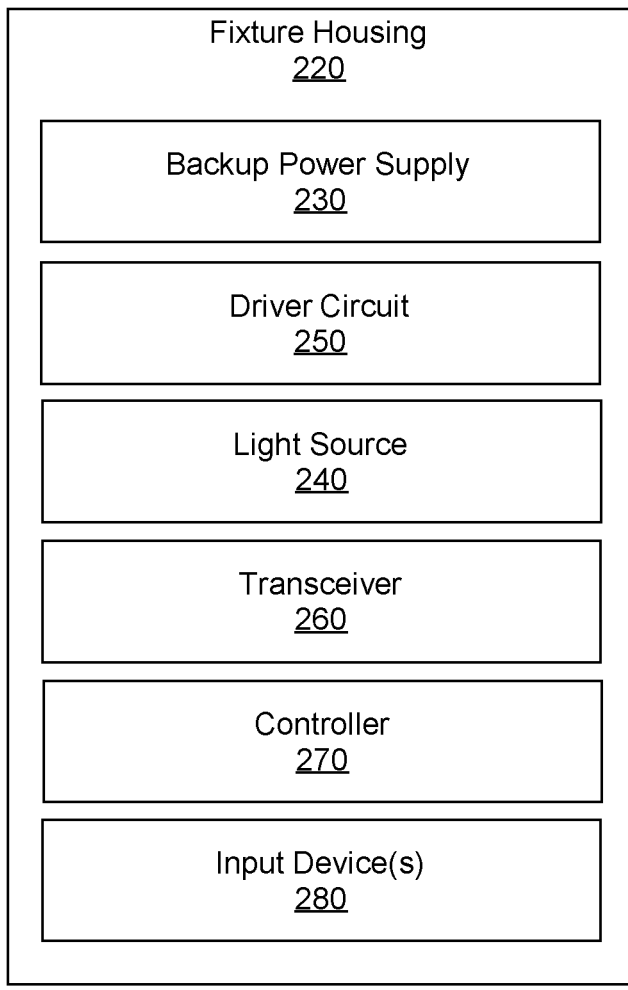
FIG. 2. depicts a block diagram of an emergency lighting fixture according to example embodiments of the present disclosure.

Referring briefly now to FIG. 2., a block diagram of the emergency lighting fixture 110 is provided according to example embodiments of the present disclosure. As shown, the emergency lighting fixture 110 can include a fixture housing 220 configured to accommodate various components of the emergency lighting fixture 110. It should be appreciated that the fixture housing 220 can be made from any suitable material. For example, the fixture housing 220 can be comprise of a thermoplastic material.

As shown, the emergency lighting fixture 110 can include a backup power supply 230. The backup power supply 230 can include one or more batteries. It should be appreciated that any suitable type of battery can be used. For instance, in some implementations, the backup power supply 230 can include one or more sealed lead acid (SLA) batteries. In alternative implementations, the backup power supply 230 can include one or more Nickel Cadmium (NiCd) batteries.

As will be discussed below in more detail, the backup power supply 230 can be configured to provide electrical power (e.g., direct current (DC) power) to one or more light sources 240 of the emergency lighting fixture 110 during a power outage, such as an interruption in the supply of alternating current (AC) power the emergency lighting fixture 110 is configured to receive from a mains power supply 120 (FIG. 1). It should be appreciated that the mains power supply 120 can be configured to provide any suitable alternating current (AC) voltage, such as 120 Volts or 277 Volts.

In some implementations, the one or more light sources 240 can include one or more LED devices. It should be appreciated, however, that the emergency lighting fixture 110 can include any suitable type of light source. For instance, in some implementations, the one or more light sources 240 can include one or more fluorescent light bulbs.

In some implementations, the emergency lighting fixture 110 can include a driver circuit 250 configured to receive an input power from a power source (e.g., mains power supply 120 or backup power supply 230) and convert the input power to a driver output (e.g., driver current) suitable for powering the one or more light sources 240. The driver circuit 250 can include various components, such as switching elements (e.g., transistors). Gate timing commands can be provided to the one or more switching elements to convert the input power to the driver output. In this manner, the one or more light sources 240 can illuminate a room or area (e.g., hallway) in which the emergency lighting fixture 110 is located, In some implementations, the emergency lighting fixture 110 can include a transceiver 260. It should be appreciated that the transceiver 260 can be configured to transmit data via any suitable wireless protocol. For instance, the transceiver 260 can be configured to transmit data via a Bluetooth Low Energy (BLE) protocol. Alternatively, the transceiver 260 can be configured to transmit data via a Zigbee protocol or any other suitable sub-gigahertz (GHz) protocol.

Figure 3:
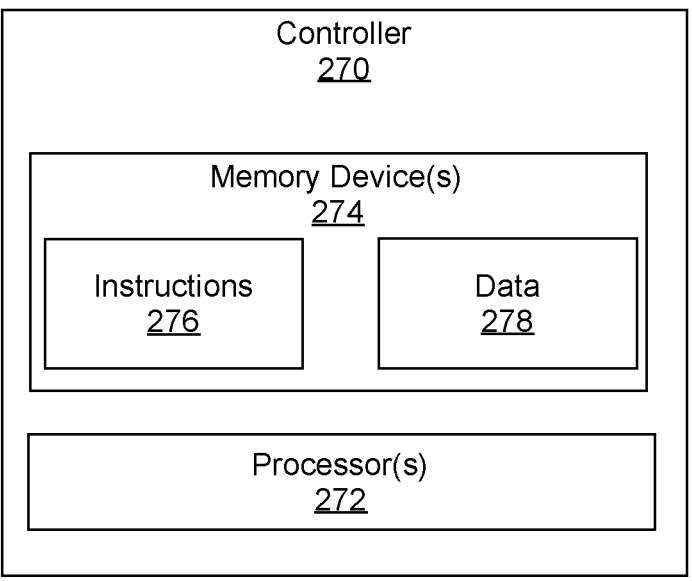
FIG. 3 depicts a block diagram of a controller according to example embodiments of the present disclosure.

In some implementations, the emergency lighting fixture 110 can include a controller 270. FIG. 3 illustrates one embodiment of suitable components of the controller 270. As shown, the controller 270 can include one or more processors 272 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the controller 270 can include a memory device 274. Examples of the memory device 274 can include computer-readable media including, but not limited to, non-transitory computer-readable media, such as RAM, ROM, hard drives, flash drives, or other suitable memory devices. The memory device 274 can store information accessible by the processor(s) 272, including computer-readable instructions 276 that can be executed by the processor(s) 272. The computer-readable instructions 276 can be any set of instructions that, when executed by the processor(s) 272, cause the processor(s) 272 to perform operations. The computer-readable instructions 276 can be software written in any suitable programming language or can be implemented in hardware. The memory device 274 may also store data 278 identifying the emergency lighting fixture 110, In some implementations, the data 278 can include a unique identifier (e.g., identification code) assigned to the emergency lighting fixture 110. Alternatively or additionally, the data 278 can include a unique identifier assigned to a building in which the emergency lighting fixture is installed. In some implementations, the data 278 can indicate a location of the emergency lighting fixture 110 within the building. Alternatively or additionally, the data 278 can indicate a geographical location (e.g., country, state, city) of the building in which the emergency lighting fixture 110 is installed. In some implementations, the data 278 can indicate a date (e.g., month, day, year) of manufacture for the emergency lighting fixture 110.

In some implementations, at least a portion of the data 278 identifying the emergency lighting fixture 110 can be generated via manipulation of one or more input devices 280 of the emergency lighting fixture 110. For example, the one or more input devices 280 can include one or dual in-line package (DIP) switches operatively coupled to the controller 270. It should be appreciated that the input devices 280 can include any type of device suitable for inputting data identifying the emergency lighting fixture 110.

In some implementations, the controller 270 can be configured to determine a status of the backup power supply 230. More specifically, the status of the backup power supply 230 can indicate whether one or more batteries of the backup power supply 230 need to be replaced. In some implementations, the controller 270 can be configured to monitor a terminal voltage of the one or more batteries and determine the status of the backup power supply 230 based, at least in part, on the terminal voltage. It should be appreciated, however, that the controller 270 can be configured to implement any suitable battery monitoring algorithm to determine the status of the backup power supply 230.

In some implementations, the controller 270 can be configured to transmit a beacon signal 130 (FIG. 1) via the transceiver 260. More specifically, the beacon signal 130 can indicate the status of the backup power supply 230. Additionally, the beacon signal can include data identifying the emergency lighting fixture 110. In some implementations, the controller 270 can be configured to transmit the beacon signal 13( )only when the terminal voltage of the one or more batteries falls below a threshold voltage required to illuminate the one or more light sources 240 during a power outage. In alternative implementations, the controller 270 can be configured to continuously transmit the beacon signal 130 regardless of whether the terminal voltage is above or below the threshold voltage.

Referring again to FIG. 1, the beacon signal 130 can be detected (e.g., received) by a first remote device 140 that is within a predetermined proximity 150 of the emergency lighting fixture 110. As shown, a second remote device 142 that is not within the predetermined proximity 150 of the emergency lighting fixture 110 cannot detect the beacon signal 130. In some implementations, the first remote device 140 can detect the beacon signal 130 when the first remote device 140 is within one hundred meters (100 meters) of the emergency lighting fixture 110. It should be appreciated that the range of the beacon signal 130 depends, at least in part, on the wireless protocol (e.g., Bluetooth Low Energy (BLE), Zigbee, etc.) that is used to transmit the beacon signal 130.

In some implementations, the first remote device 140 can include a barcode scanner. More specifically, the barcode scanner can include a receiver configured to receive the beacon signal 130. In this manner, the barcode scanner can detect the beacon signal 130 when the barcode scanner is within the predetermined proximity 150 of the emergency lighting fixture 100. In alternative implementations, the first remote device 140 can include a user device, such as a mobile computing device. Examples of mobile computing devices can include, without limitation, a smartphone, a tablet, a laptop, a personal digital assistant (PD A)

In some implementations, the first remote device 140 can be configured to determine whether the one or more batteries of the backup power supply 230 (FIG. 2) need to be replaced based, at least in part, on the beacon signal 130. More specifically, first remote device 140 can determine whether the one or more batteries need to be replaced based on the status of the backup power supply 230. For example, if the status of the backup power supply 230 indicates the terminal voltage of the one or more batteries is above the threshold voltage needed to illuminate the one or more light sources 240 (FIG. 2), then the first remote device 140 can determine the one or more batteries do not need to be replaced.

In contrast, if the status of the backup power supply 230 indicates the terminal voltage of the one or more batteries is below the threshold voltage, then the first remote device 140 can determine the one or more batteries need to be replaced. As will be discussed below, the first remote device 140 can be configured to generate a notification (e.g., email, text message, etc.) based, at least in part, on the status of the backup power supply 230 (FIG. 2). When the status of the backup power supply 230 indicates the terminal voltage of one or more batteries is below the threshold voltage, the first remote device 140 can generate a notification to perform a maintenance action (e.g., replace batteries) on the emergency lighting fixture 110. When the status of the backup power supply 230 indicates the terminal voltage of the one or more batteries is at or above the threshold voltage, the notification can indicate the backup power supply 230 is operational.

In some implementations, the first remote device 140 can be in communication with a network 160. In this manner, the first remote device 140 can communicate the notification to another device (not shown) via the network 160. For example, the first remote device 140 can communicate the notification to a mobile computing device associated with one or more personnel (e.g., facilities manager). In this manner, the appropriate personnel can be notified that the one or more batteries of the backup power supply 230 (FIG. 2) onboard the emergency lighting fixture 110 need to be replaced. As another example, the first notification device 140 can communicate the notification to a computing device configured to store a log indicative of maintenance history for the emergency lighting fixture 110. It should be appreciated that the computing device can be configured to update the log in real-time or near real-time based on the notification. In this manner, the log can be automatically updated each time the first remote device 140 is within the predetermined proximity 150 of the emergency lighting fixture 100.

The network 160 can be any suitable type of network, such as a Power-Over-Ethernet (POE) network, a local area network (e.g., intranet), a wide area network (e.g., internet), or some combination thereof and can include any number of wired or wireless links. In general, communication over the network 160 can be implemented via any type of wired or wireless connection, using a wide variety of communication protocols, encodings or formats, and/or protection schemes.

Example communication technologies used in accordance with example aspects of the present disclosure can include, for instance, Wi-Fi (e.g., IEEE, 802.11), Wi-Fi Direct (for peer-to-peer communication), cellular communication, LTE, low-power wide area networking, VSAT, Ethernet, MoCA (Multimedia over Coax Alliance), PLC (Power-line communication), DLT (digital line transmission), Power over Ethernet, etc, Other suitable wired and/or wireless communication technologies can be used without deviating from the scope of the present disclosure. For instance, one or more protocols (e.g., Zigbee) associated with the IEEE 802.15 standard can be used without deviating from the scope of the present disclosure.

Figure 4:
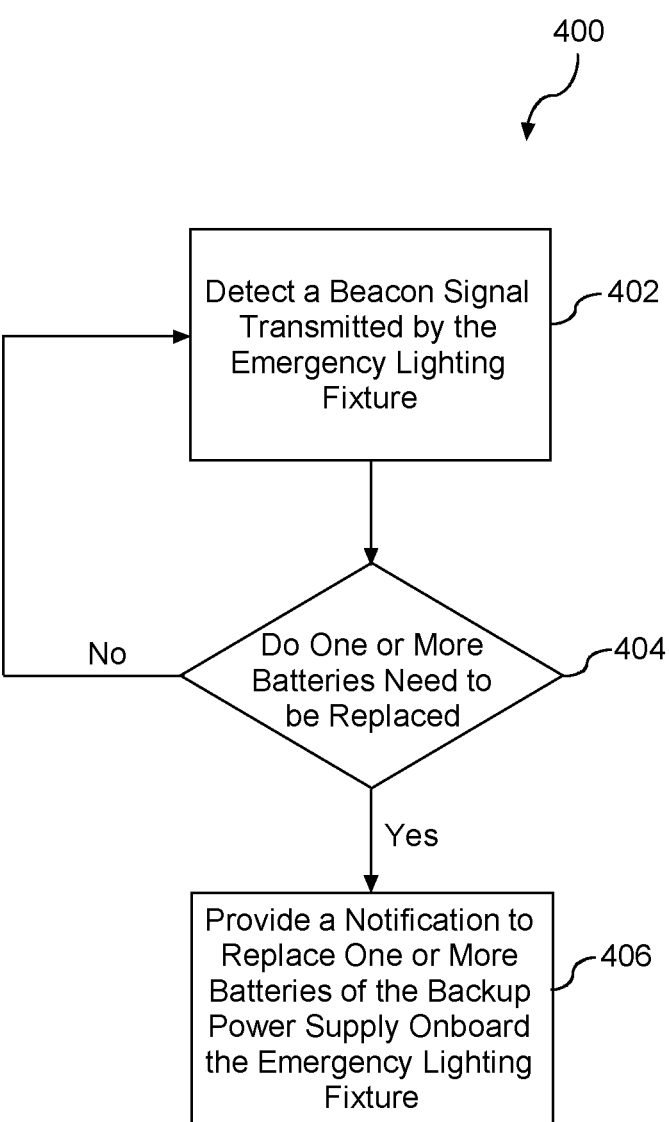
FIG. 4 depicts a flow diagram of a method according to example embodiments of the present disclosure.

Referring now to FIG. 4, a flow diagram of a method 400 for generating a notification to replace one or more batteries of a backup power supply onboard an emergency lighting fixture is provided according to example embodiments of the present disclosure. In general, the method 400 will be discussed herein with reference to the emergency lighting system 100 described above with reference to FIGS. 1 through 3. However, it should be appreciated by those of ordinary skill in the art that the disclosed method 400 can generally be implemented with emergency lighting systems having any other suitable configuration. In addition, although FIG. 4 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (402), the method 400 includes detecting a beacon signal transmitted by the emergency lighting fixture. In example embodiments, the beacon signal can be detected by a remote device that is within a predetermined proximity of the emergency lighting fixture. In some implementations, the remote device can be a barcode scanner. More specifically, the barcode scanner can include a receiver that is configured to receive the beacon signal when the barcode scanner is within the predetermined proximity of the emergency lighting fixture. In alternative implementations, the remote device can include a mobile computing device (e.g., smartphone, tablet, laptop, etc.). More specifically, the mobile computing device can include a receiver that is configured to receive the beacon signal when the mobile computing device is within the predetermined proximity of the emergency lighting fixture.

At (404), the method 400 can include determining whether the one or more batteries of the backup power supply need to be replaced. In some implementations, the beacon signal detected at (402) can indicate the status of the backup power supply. More specifically, the status of the backup power supply can indicate whether a terminal voltage of the one or more batteries is above or below a threshold voltage needed to power one or more light sources of the emergency lighting fixture during a power outage. In some implementations, the remote device can determine the one or more batteries need to be replaced when the status of the backup power supply indicates the terminal voltage of the one or more batteries is below the threshold voltage. If the remote device determines the one or more batteries need to be replaced, the method proceeds to (406). Otherwise, the method reverts to (402).

At (406), the method 400 includes generating a notification to perform a maintenance action on the emergency lighting fixture. In some implementations, the remote device can be in communication with a network and can be configured to communicate the notification to another device via the network. Examples of the notification can include, without limitation, an e-mail and/or a short message service (SMS) text message. In some implementations, the notification can be displayed by the remote device prior to communicating the notification over the network. In this manner, a user operating the remote device can review and approve the notification prior to communicating the notification over the network. In alternative implementations, the notification can be automatically communicated over the network without requiring any user-intervention.

Figure 5:
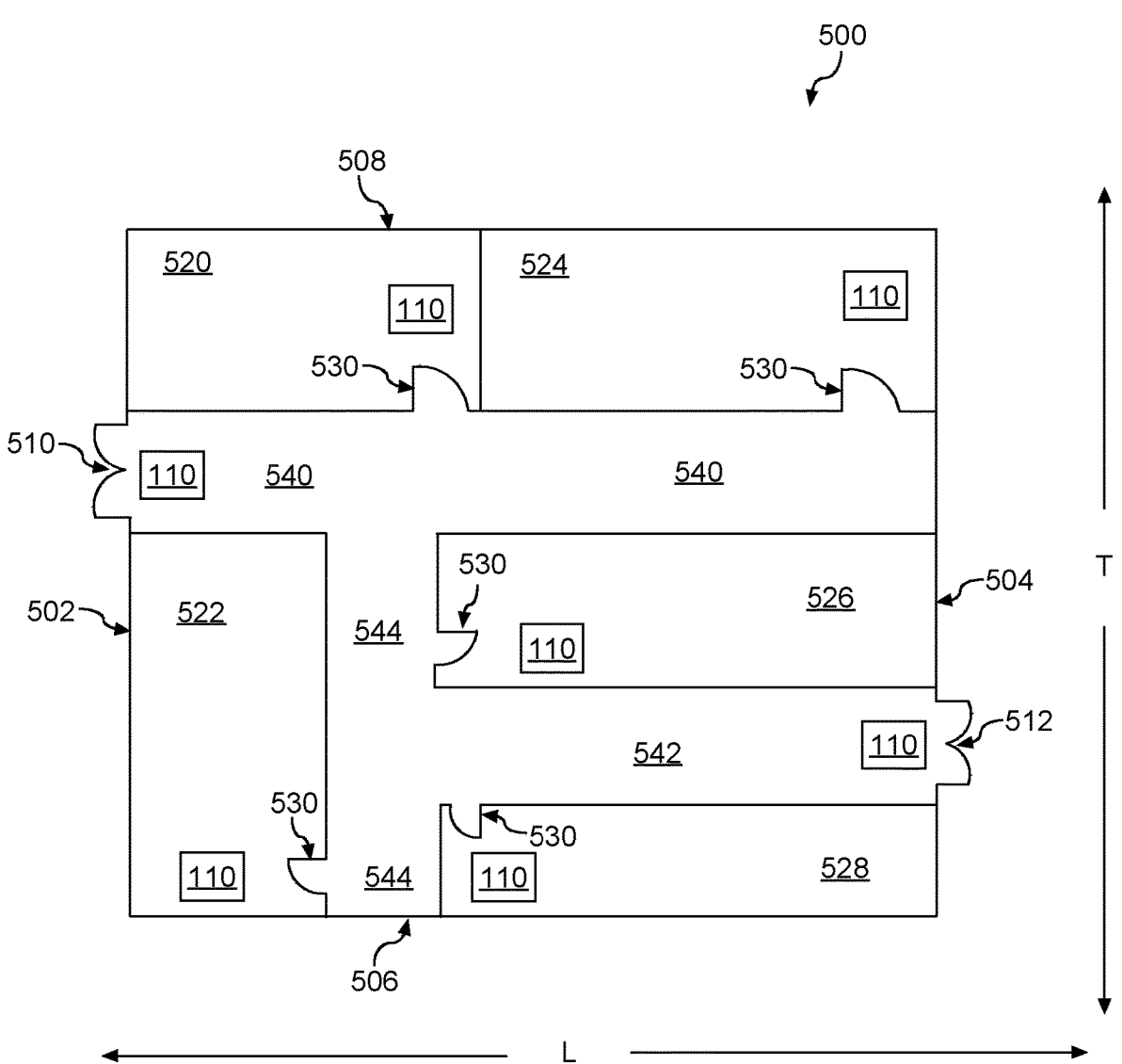
FIG. 5 depicts a building in which the emergency lighting system of FIG. 1 can be installed according to example embodiments of the present disclosure.

Referring now to FIG. 5, a plan view of an example building 500 is provided according to example embodiments of the present disclosure. The building 500 defines a lateral direction L and a transverse direction T. As shown, the building 500 extends along the lateral direction L between a front portion 502 and a rear portion 504. Additionally, the building 500 extends along the transverse direction T between a first side 506 and a second side 508. The building 500 includes a first entrance 510 and a second entrance 512. As shown, the first entrance 510 is positioned at the front portion 502 of the building 500, whereas the second entrance 512 is positioned at the rear portion 504 of the building 500. It should be appreciated that the interior of the building 500 can be accessed via the first entrance 51( )and the second entrance 512.

In some implementations, the interior of the building 500 includes a plurality of rooms 520, 522, 524, 526, 528. It should be appreciated that each room of the plurality of rooms 520, 522, 524, 526, 528 is accessible via a door 530 that is movable between a first position and a second position. When the door 530 is in the first position, one or more persons can enter or exit the rooms 520, 522, 524, 526, 528. When the door 530 is in the second position, one or more persons cannot enter or exit the rooms 520, 522, 524, 526, 528.

In some implementations, the interior of the building 500 includes a first hallway 540, a second hallway 542, and a third hallway 544 that joins the first hallway 540 with the second hallway 542, As shown, emergency lighting fixture 110 can be installed in the interior of the building 500. More specifically, at least one emergency lighting fixture 110 can be installed in each of the plurality of rooms 520, 522, 524, 526, 528. Additionally, emergency lighting fixtures 110 can be installed in the hallways 540, 542, 544. In this manner, emergency lighting fixtures 110 can be positioned throughout the interior of the building 500.

It should be appreciated that the building 500 can be used for any intended purpose. For instance, the building 500 can be a retail store. Alternatively, the building 500 can be restaurant, school, office complex, or any other suitable type of building. It should also be appreciated that the floor plan depicted in FIG. 5 is only intended to be an example of a building. As such, modifications to the floor plan are within the scope of the present disclosure.

Figure 6:
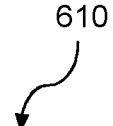
FIG. 6 depicts a block diagram of an emergency lighting fixture according to example embodiments of the present disclosure.
Figure 6:
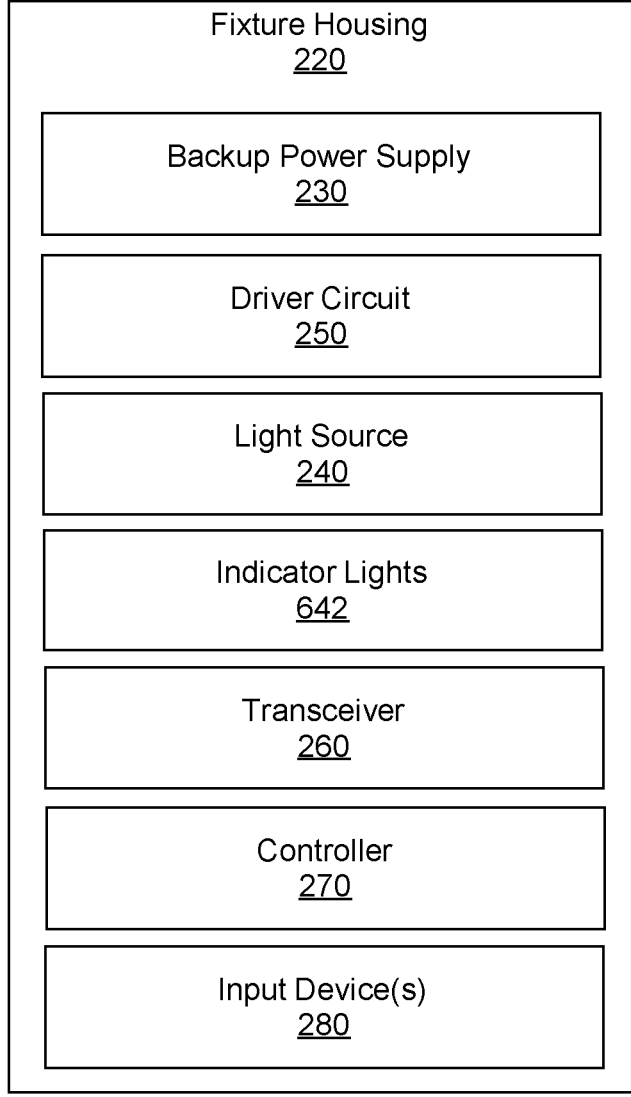

Referring now to FIG. 6, a block diagram of components of another emergency lighting fixture 610 is provided according to example embodiments of the present disclosure. As shown, the emergency lighting fixture 610 of FIG. 6 can be configured in substantially the same manner as the emergency lighting fixture 110 of FIG. 2. For instance, the emergency lighting fixture 610 of FIG. 6 can include the backup power supply 230 and the controller 270. However, in contrast to the emergency lighting fixture 110 of FIG. 2, the emergency lighting fixture 610 of FIG. 6 can include one or more status indicator lights 642. In some implementations, the one or more indicator light(s) 642 can include a plurality of LED indicator lights. As will be discussed below in more detail, the one or more indicator light(s) 642 can be activated (e.g. illuminated) to indicate a status of the emergency lighting fixture 610.

In some implementations, the indicator light(s) 642 can be activated to indicate a fault condition associated with one or more batteries of the backup power supply 230. For instance, the fault condition can indicate the one or more batteries being disconnected from a charging circuit (not shown) of the emergency lighting fixture 610. When the controller 270 determines the fault condition associated with the one or more batteries being disconnected from the charging circuit exists, the controller 270 can control operation of the indicator light(s) 642 such that the indicator light(s) 642 flash at a predetermined frequency. In this manner, the indicator light(s) 642 can provide a visual cue (e.g., blinking light) to prompt a person to reconnect the one or more batteries to the charging circuit.

Alternatively or additionally, the fault condition can indicate a state-of-charge of the one or more batteries is at or below a threshold value. When the controller 270 determines the fault condition exists, the controller 270 can control operation of the indicator light(s) 642 such that the indicator light(s) 642 flash at a predetermined frequency. In this manner, the indicator light(s) 642 can provide a visual cue to prompt a person to replace the one or more batteries.

In some implementations, the indicator light(s) 642 can be activated to indicate a fault condition associated with the charging circuit of the lighting fixture 610. The charging circuit can be configured to charge the one or more batteries of the backup power supply 230. When the controller 270 determines the fault condition associated with the charging circuit exists, the indicator light(s) 642 can flash at a predetermined frequency. In this manner, the indicator light(s) 642 can provide a visual cue to prompt a person to replace the lighting fixture 610.

In some implementations, the indicator light(s) 642 can be activated to indicate a fault condition associated with the driver circuit 250 of the lighting fixture 610. When the controller 270 determines the fault condition associated with the driver circuit 250 exists, the controller 270 can control operation of the indicator light(s) 642 such that the indicator light(s) 642 flash at a predetermined frequency. In this manner, the indicator light(s) 242 can provide a visual cue to prompt a person to replace the lighting fixture 610.

In some implementations, the controller 270 can be configured to determine a status of the lighting fixture 610 based, at least in part, on user-manipulation of the one or more input devices 280 onboard the lighting fixture 610. For instance, the controller 270 can be configured to perform a monthly test (e.g. five minutes) of the backup power supply 230 based on user-input received via. manipulation of a first input device of the emergency lighting fixture 110. Alternatively, the controller 270 can be configured to perform an annual test (e.g., ninety minutes) of the backup power supply 230 based on user-input received via manipulation of a second input device of the emergency lighting fixture 110.

Alternatively, the controller 270 can be configured to determine a status of the lighting fixture 610 at predetermined intervals of time. For instance, the controller 270 can include a real-time clock (RTC) and can be configured to determine the status of the lighting fixture at the predetermined intervals, such as every twenty-eight days 28. In some embodiments, the controller 270 can be configured to determine the status of the lighting fixture at random intervals of time.

In some implementations, the controller 270 can be configured to provide a notification each time a monthly test or annual test of the lighting fixture 610, specifically the backup power supply 230, is completed without detecting any fault conditions (e.g., battery disconnected, battery state-of-charge-low, faulty driver circuit, etc.) As will be discussed below in more detail, the notification can be provided to on one or more gateway devices.

Figure 7:
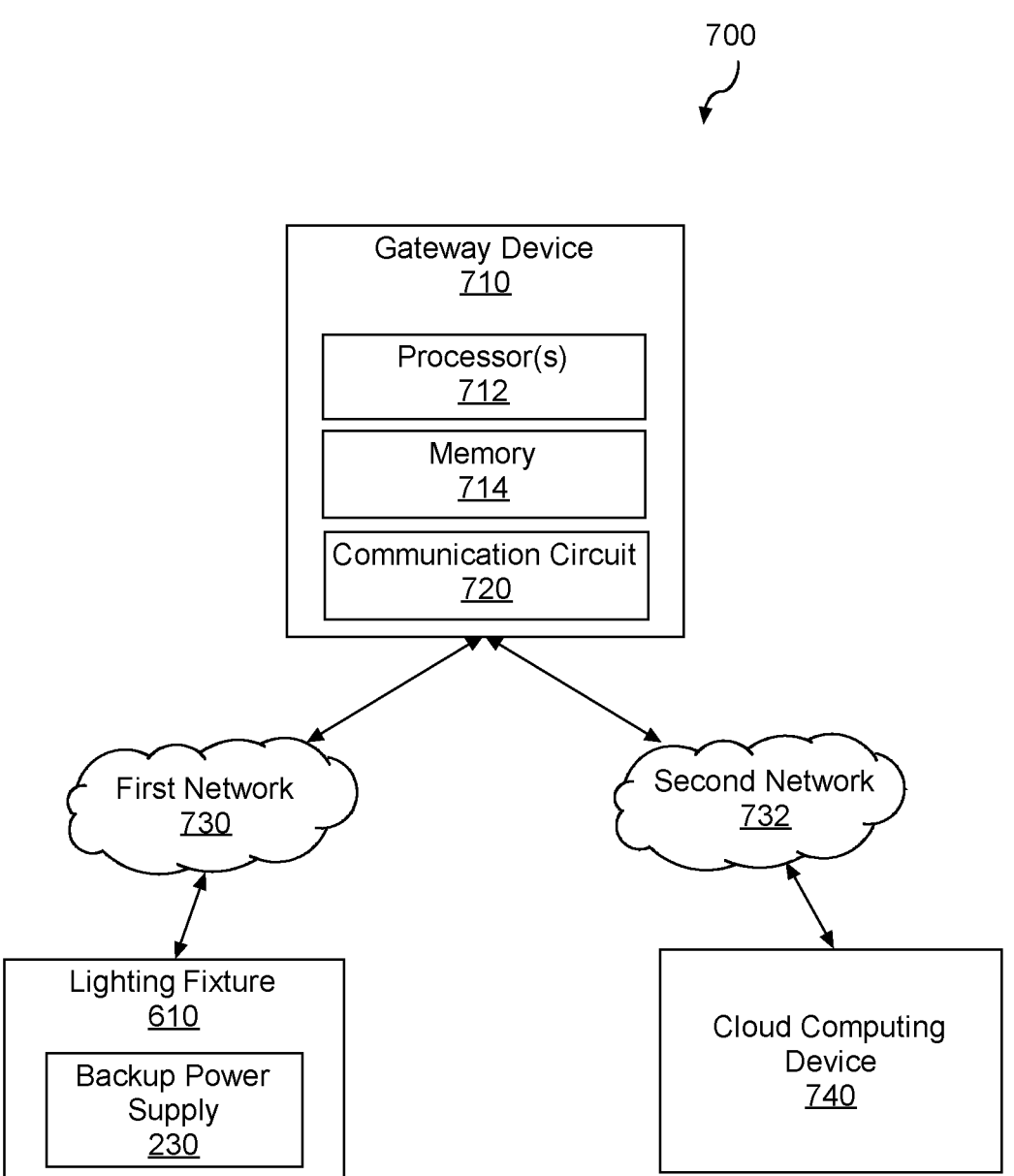
FIG. 7 depicts a block diagram of a system for monitoring operation of the emergency lighting fixture of FIG. 6 according to example embodiments of the present disclosure.

Referring now to FIG. 7, another emergency lighting system 700 is provided according to example embodiments of the present disclosure. As shown, the emergency lighting system 700 can include the emergency lighting fixture 610 discussed above with reference to FIG. 6. In some implementations, the emergency lighting system 700 can include a gateway device 710.

As shown, the gateway device 710 can include one or more processor(s) 712 and one or more memory device(s) 714. The one or more processor(s) 712 can include any suitable processing device, such as a microprocessor, microcontroller, integrated circuit, logic device, or other suitable processing device. The one or more memory device(s) 714 can include one or more computer-readable media, including, but not limited to, non-transitory computer-readable media, RAM, ROM, hard drives, flash drives, or other memory devices.

The one or more memory device(s) 714 can store information accessible by the one or more processor(s) 712, including computer-readable instructions that can be executed by the one or more processor(s) 712. The instructions can be any set of instructions that, when executed by the one or more processor(s) 712, cause the one or more processor(s) 712 to perform operations. The instructions can be software written in any suitable programming language or may be implemented in hardware. In some implementations, the instructions may be executed by the one or more processor(s) 712 to cause the one or more processor(s) 712 to perform operations, such as obtaining data from the lighting fixture 610 that is indicative of a status (e.g., voltage level) of one or more components (e.g., backup power supply 230) of the lighting fixture 610.

The memory device(s) 714 can further store data that can be accessed by the processor(s) 712. The data can include one or more table(s), function(s), algorithm(s), model(s), equation(s), etc. according to example embodiments of the present disclosure. As an example, in some implementations, the data can include data (e.g., status of the backup power supply 230) obtained from the lighting fixture 610, In some implementations, the gateway device 710 can include a communication circuit 720 used to communicate with the emergency lighting fixture 610 and/or a cloud computing device 740. The communication circuit 720 may include any suitable components for interfacing with one or more network(s), including for example, transmitters, receivers, ports, controllers, antennas, or other suitable components.

In some implementations, the gateway device 710 can be configured to communicate with the emergency lighting fixture 610 over a first network 730 and the cloud computing device 740 over a second network 732 that is different than the first network 730. In this manner, the gateway device 710 can facilitate communications between the lighting fixture 610 and the cloud computing device 740. In some implementations, the first network 730 can be a Bluetooth low energy mesh network.

Alternatively or additionally, the second network 732 can be a Wifi network. It should be appreciated, however, that the first network 730 and the second network 732 can include any suitable wired or wireless network. For instance, in some implementations, the first network 730 can be a Zigbee network. Alternatively or additionally, the first network 730 can be a power over ethernet (POE) network.

It should be appreciated that, in some implementations, data communicated over the first network 730 and/or the second network 732 can be encrypted. In this manner, the emergency lighting system 700 can prevent unauthorized personnel (e.g., hackers) from obtaining the data transmitted between the emergency lighting fixture 610 and the gateway device 710 and/or data transmitted between the gateway device 710 and the cloud computing device 740.

In some implementations, the gateway device 710 can be configured to obtain data from the lighting fixture 610 via the first network 730. For instance, the data can be indicative of a fault condition associated with one or more components of the emergency lighting fixture 610, such as the backup power supply 230. As an example, the data can indicate one or more batteries of the backup power supply 230 are disconnected from a charging circuit of the emergency lighting fixture 610. Alternatively or additionally, the data can indicate a state-of-charge of the one or more batteries is below a threshold value required to drive the one or more light sources 240 (FIG. 6) during an emergency condition (e.g., grid-fault). It should be appreciated, however, that data can indicate a fault condition associated with any suitable component of the emergency lighting fixture 610. For instance, the data can indicate a fault condition associated with the driver circuit 250 of the emergency lighting fixture 610. Alternatively or additionally, the data can indicate a fault condition associated with a charging circuit of the emergency lighting fixture 610.

In some implementations, the gateway device 710 can provide the data to the cloud computing device 640 for processing and/or storage. As will be discussed below, one or more persons can access the data via a connected device (not shown) on the second network 732. For instance, in some implementations, the connected device can be a workstation (e.g., desktop computer). Alternatively or additionally, the connected device can be a user device (e.g., smartphone, tablet, etc.). In this manner, the one or more users can access the data via the connected device to determine whether the emergency lighting fixture 610 is functioning properly. More specifically, the one or more users can access the data to determine whether one or more batteries of the backup power supply 230 for the emergency lighting fixture 610 need to be replaced.

The emergency lighting system 700 of the present disclosure provides numerous technical benefits. For instance, the emergency lighting system 700 eliminates the need for manually testing each emergency lighting fixture in a facility. In addition, the emergency lighting system 700 provides notification of detected faulty components of one or more emergency lighting fixtures. In this manner, the emergency lighting system 7000 allows building managers or other authorized personnel to detect faulty lighting fixtures in a more timely manner. As such, the emergency lighting system 700 reduces or eliminates the likelihood of emergency lighting fixtures failing to operate during an actual emergency condition.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An emergency lighting fixture, comprising:
a backup power supply comprising one or more batteries;
one or more light sources;
one or more dual in-line package (DIP) switches;
a transceiver; and
a controller configured to perform operations, the operations comprising:
  determining a status of the backup power supply; and
  transmitting, a beacon signal via the transceiver, according to a wireless radio communications protocol, the beacon signal detectable by a receiver of a barcode scanner tuned to receive the beacon signal only when the barcode scanner is within a predetermined proximity of the emergency lighting fixture, the beacon signal comprising the status of the backup power supply,
  wherein the barcode scanner is not a smart phone, tablet, or computer, and
  wherein the beacon signal includes data including an identification code of the emergency lighting fixture, the identification code of the emergency lighting fixture having been generated by manipulation of the one or more DIP switches,
  wherein the data also includes an identification code of a building in which the emergency lighting fixture is installed,
  wherein the data indicates a location of the emergency lighting fixture within the building,
  wherein the barcode scanner is configured to autonomously determine whether the one or more batteries require replacement based on the beacon signal and to generate a maintenance notification without requiring user interaction,
  wherein the beacon signal is transmitted via the transceiver regardless of whether a terminal voltage of the one or more batteries is above or below a threshold voltage
  wherein providing, by the barcode scanner, the maintenance notification to replace the one or more batteries includes first receiving approval from a user via a display screen of the barcode scanner, and
  wherein providing the maintence notification to replace the one or more batteries comprises providing, in response to the approval, the maintence notification over a wireless network to a gateway device communicatively coupling the barcode scanner to a cloud computing device.

2. The emergency lighting fixture of claim 1, wherein determining a status of the backup power supply comprises:
monitoring a terminal voltage of the one or more batteries; and
determining the status of the backup power supply based, at least in part, on the terminal voltage.

3. The emergency lighting fixture of claim 2, wherein transmitting the beacon signal occurs when the terminal voltage is less than a threshold voltage needed to power the one or more light sources during a power outage.

4. The emergency lighting fixture of claim 2, wherein transmitting the beacon signal occurs when the terminal voltage is greater than a threshold voltage needed to power the one or more light sources during a power outage.

5. The emergency lighting fixture of claim 1, wherein the data indicates a geographical location of the building in which the emergency lighting fixture is located.

6. The emergency lighting fixture of claim 1, wherein the data includes a date of manufacture for the emergency lighting fixture.

7. The emergency lighting fixture of claim 1, wherein the one or more light sources comprise one or more light emitting diode (LED) devices.

8. The emergency lighting fixture of claim 1, further comprising:

a plurality of indicator lights, each of the indicator lightings configured to emit light of a color indicative of a fault condition associated with the emergency lighting fixture.

9. A method for generating a notification to replace one or more batteries of a backup power supply onboard an emergency lighting fixture, the method comprising:

transmitting, via a transceiver of the emergency lighting fixture according to a wireless radio communications protocol, a beacon signal regardless of whether a terminal voltage of the one or more batteries is above or below a threshold voltage;

obtaining, at a receiver of a barcode scanner tuned to receive the beacon signal only when the barcode scanner is within a predetermined proximity of the emergency lighting fixture, the beacon signal transmitted by the emergency lighting fixture; and determining, by the barcode scanner, the one or more batteries need to be replaced based, at least in part, on the beacon signal; and responsive to determining the one or more batteries need to be replaced, providing without user interaction, by the barcode scanner, the notification to replace the one or more batteries, wherein the barcode scanner is not a smart phone, tablet, or computer, wherein the beacon signal includes data including an identification code of the emergency lighting fixture, the identification code being generated by the emergency lighting fixture based on a manipulation of one or more DIP switches of the emergency lighting fixture, wherein the data also includes an identification code of a building in which the emergency lighting fixture is installed, wherein the data indicates a location of the emergency lighting fixture within the building, wherein providing, by the barcode scanner, the notification to replace the one or more batteries includes first receiving approval from a user via a display screen of the barcode scanner, and wherein providing the notification to replace the one or more batteries comprises providing, in response to the approval, the notification over a wireless network to a gateway device communicatively coupling the barcode scanner to a cloud computing device.

* * * * *